(12) United States Patent
Tsutsui

(10) Patent No.: US 11,189,879 B2
(45) Date of Patent: *Nov. 30, 2021

(54) BATTERY MODULE THAT INCLUDES LIQUID BATTERY MODULE AND SOLID BATTERY MODULE

(71) Applicant: Panasonic Intellectual Property Management Co., Ltd., Osaka (JP)

(72) Inventor: Yasutaka Tsutsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,978

(22) Filed: Apr. 23, 2019

(65) Prior Publication Data

US 2020/0014009 A1 Jan. 9, 2020

(30) Foreign Application Priority Data

Jul. 5, 2018 (JP) .............................. JP2018-128467

(51) Int. Cl.
*H01M 50/24* (2021.01)
*B60L 50/64* (2019.01)
*H01M 50/20* (2021.01)

(52) U.S. Cl.
CPC ............ *H01M 50/24* (2021.01); *B60L 50/64* (2019.02); *H01M 50/20* (2021.01); *B60Y 2200/91* (2013.01); *B60Y 2400/112* (2013.01); *H01M 2220/20* (2013.01)

(58) Field of Classification Search
CPC .... H01M 2/1094; H01M 2/1077; B60L 50/64

USPC ......................................................... 318/139
See application file for complete search history.

(56) References Cited

U.S. PATENT DOCUMENTS

| | | | |
|---|---|---|---|
| 5,196,275 A | 3/1993 | Goldman et al. | |
| 6,074,774 A * | 6/2000 | Semmens | H01M 10/02 |
| | | | 429/120 |
| 6,238,813 B1 | 5/2001 | Maile et al. | |
| 6,376,128 B1 * | 4/2002 | Goto | H01M 10/0565 |
| | | | 429/304 |
| 7,570,012 B2 | 8/2009 | Dasgupta et al. | |
| 7,679,314 B2 | 3/2010 | Elder et al. | |
| 7,887,955 B2 | 2/2011 | Saruwatari et al. | |
| 8,889,285 B2 | 11/2014 | Sastry et al. | |
| 9,263,779 B2 | 2/2016 | Lee et al. | |
| 9,312,522 B2 | 4/2016 | Bradwell et al. | |

(Continued)

FOREIGN PATENT DOCUMENTS

EP 3419102 A1 12/2018
JP 2004-039523 2/2004
(Continued)

OTHER PUBLICATIONS

The Extended European Search Report dated Jul. 26, 2019 for the related European Patent Application No. 191717180.0.
(Continued)

*Primary Examiner* — Kawing Chan
(74) *Attorney, Agent, or Firm* — McDermott Will and Emery LLP

(57) ABSTRACT

A battery module includes a first liquid battery module and a first solid battery module. The first solid-state battery module has a larger volume than a volume of the first liquid battery module.

19 Claims, 8 Drawing Sheets

(56) References Cited

U.S. PATENT DOCUMENTS

| | | |
|---|---|---|
| 9,553,346 B2 | 1/2017 | Hermann |
| 9,819,053 B1* | 11/2017 | Zimmerman ..... H01M 10/0565 |
| 10,008,708 B2 | 6/2018 | Wu et al. |
| 10,050,303 B2 | 8/2018 | Anandan et al. |
| 10,177,348 B2 | 1/2019 | Takahata |
| 10,541,442 B2 | 1/2020 | Iwasaki et al. |
| 10,593,994 B2 | 3/2020 | Yokoyama et al. |
| 10,615,382 B2 | 4/2020 | Takasaki |
| 10,615,410 B2 | 4/2020 | Essaki et al. |
| 10,741,896 B2 | 8/2020 | Ishii et al. |
| 10,749,156 B2 | 8/2020 | Newman et al. |
| 10,873,106 B2 | 12/2020 | Miller et al. |
| 2003/0072996 A1* | 4/2003 | Roh ................. H01M 10/0413 429/144 |
| 2003/0186116 A1* | 10/2003 | Tanjou ................ H01M 16/00 429/101 |
| 2014/0234685 A1* | 8/2014 | Nitta .................... H01M 2/166 429/112 |
| 2015/0280218 A1* | 10/2015 | Zimmerman ........... H01M 4/58 429/213 |
| 2015/0349379 A1* | 12/2015 | Hozumi ................ H01M 4/139 429/304 |
| 2016/0226053 A1* | 8/2016 | Wu ..................... H01M 2/1077 |
| 2016/0308243 A1 | 10/2016 | Herle et al. |
| 2017/0133731 A1* | 5/2017 | Hermann ............ H01M 10/441 |
| 2017/0348652 A1* | 12/2017 | Ishigaki ................... B01F 3/14 |

FOREIGN PATENT DOCUMENTS

| | | |
|---|---|---|
| JP | 2012-234749 A | 11/2012 |
| JP | 2015-125919 | 7/2015 |

OTHER PUBLICATIONS

Non-Final Office Action issued in U.S. Appl. No. 15/993,560, dated Oct. 2, 2019.

Final Office Action issued in U.S. Appl. No. 15/993,560, dated Apr. 28, 2020.

Non-Final Office Action issued in U.S. Appl. No. 15/993,560, dated Sep. 15, 2020.

Final Office Action issued in U.S. Appl. No. 15/993,560, dated Dec. 30, 2020.

Notice of Allowance issued in U.S. Appl. No. 15/993,560, dated May 19, 2021.

* cited by examiner

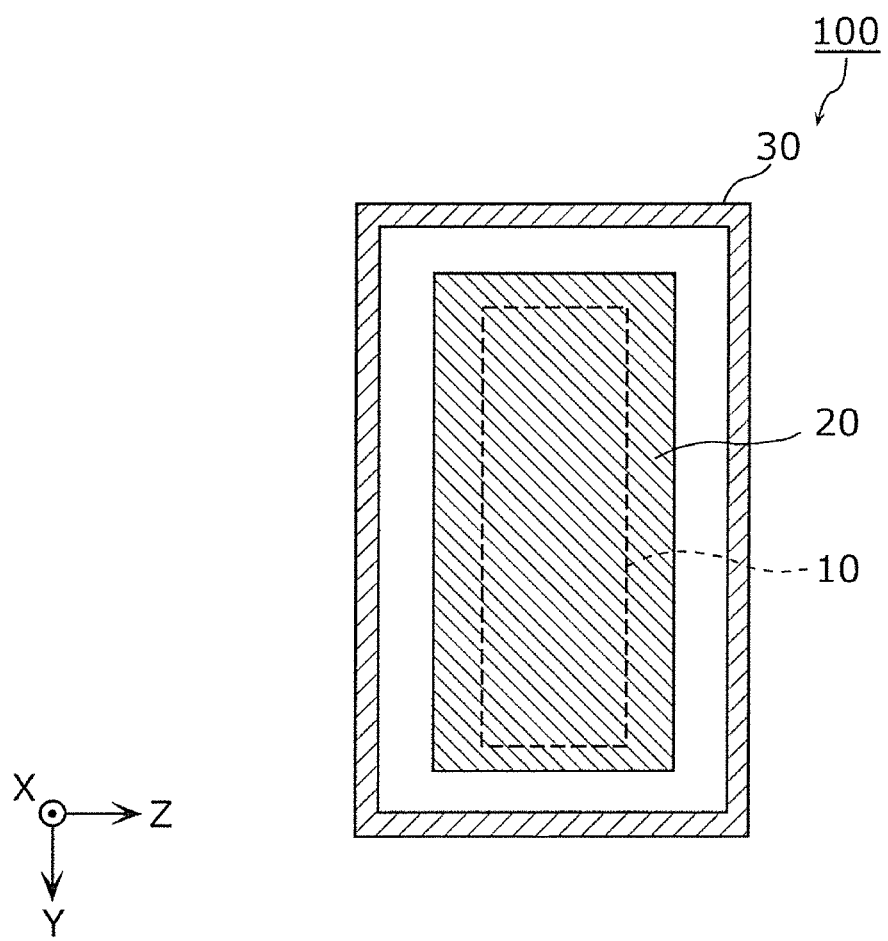

BATTERY MODULE THAT INCLUDES LIQUID BATTERY MODULE AND SOLID BATTERY MODULE

BACKGROUND

1. Technical Field

The present disclosure relates to a battery module that has a hybrid structure including one or more liquid battery modules and one or more solid-state battery modules.

2. Description of the Related Art

Japanese Patent No. 4075487 and Japanese Unexamined Patent Application Publication No. 2015-125919 disclose a structure in which liquid batteries and all-solid-state batteries are alternately arranged.

SUMMARY

A battery module including liquid battery modules and all-solid-state battery modules is problematic in that if one liquid battery module catches fire, the fire spreads to other liquid battery modules.

One non-limiting and exemplary embodiment provides a battery module that can suppress the spread of fire from one liquid battery module to other liquid battery modules.

In one general aspect, the techniques disclosed here feature a battery module that includes a first liquid battery module and a first solid-state battery module, which has a larger volume than a volume of the first liquid battery module.

It should be noted that comprehensive or specific aspects of the present disclosure may be implemented as a battery pack, a vehicle, an apparatus, a system, a method, or any selective combination thereof.

According to one aspect of the present disclosure, a highly reliable battery module, which can suppress the spread of fire from one liquid battery module to other liquid battery modules, can be implemented.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1C is a schematic cross-sectional view when the battery module according to the first embodiment is cut along a plane parallel to the Y-Z plane;

DETAILED DESCRIPTION

Figure 1A:
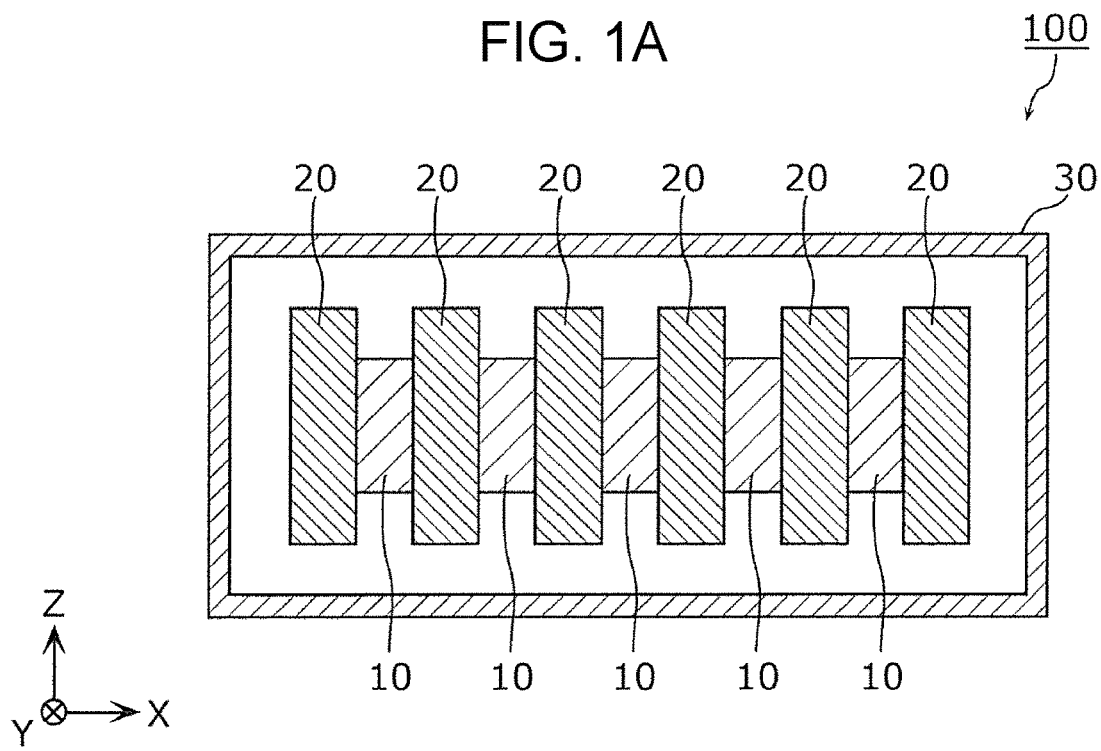
FIG. 1A is a schematic cross-sectional view when a battery module according to a first embodiment is cut along a plane parallel to the Z-X plane.

Underlying Knowledge Forming Basis of the Present Disclosure

A liquid battery that uses an electrolyte solution or a gel electrolyte including an electrolyte solution and a macromolecular compound is flammable. Therefore, if a plurality of liquid batteries are adjacently disposed, fire in one liquid battery may spread to other liquid batteries. In contrast, a battery that uses a solid electrolyte is difficult to burn because neither an electrolyte solution nor a gel electrolyte is used.

Japanese Patent No. 4075487 or Japanese Unexamined Patent Application Publication No. 2015-125919 discloses a structure in which liquid batteries and all-solid-state batteries are alternately disposed. In this type of structure, even if safety devices are not used for liquid batteries, a highly safe battery module can be provided. However, in a case that liquid batteries and all-solid-state batteries are accommodated in a battery case, there is a space around the liquid batteries and all-solid-state batteries, allowing air to flow in the space. Then, if one liquid battery catches fire, the fire may proceed beyond an adjacent all-solid-state battery together with the flow of the air and may extend to another liquid battery.

To address this problem, a battery module according to an aspect of the present disclosure has a first liquid battery module and a first solid-state battery module. The first solid-state battery module is larger than the first liquid battery module.

Thus, even if the first liquid battery module catches fire, the fire does not easily spread to other liquid battery modules because the first solid-state battery module functions as a barrier. That is, a highly reliable battery module is implemented. The first solid-state battery module may be a battery module that has a larger volume than a volume of the first liquid battery module. The first solid-state battery module may be or may not be in contact with the first liquid battery module. For example, there may be a space between the first solid-state battery module and the first liquid battery module. A plurality of solid-state battery modules including the first solid-state battery module may be disposed in succession. A plurality of liquid battery modules including the first liquid battery module may be disposed in succession. The first solid-state battery module may include an inorganic solid electrolyte or may include an organic solid electrolyte.

There is no particular limitation on the shape of the first solid-state battery module. The shape of the first solid-state battery module may be, for example, a cube, a rectangular parallelepiped, or a cylinder. There is also no particular limitation on the shape of the first liquid battery module. The shape of the first liquid battery module may be, for example, a cube, a rectangular parallelepiped, or a cylinder.

For example, the battery module further includes a second solid-state battery module. The second solid-state battery module may be disposed in contact with the first liquid battery module. The second solid-state battery module may be larger than the first liquid battery module. The first liquid battery module may be sandwiched between the first solid-state battery module and the second solid-state battery module.

Thus, even if the first liquid battery module catches fire, the fire does not easily spread to other liquid battery modules because the first solid-state battery module and second solid-state battery module between which the first liquid battery module is sandwiched function as a barrier. That is, a highly reliable battery module is implemented. The second solid-state battery module may be a battery module that has a larger volume than the volume of the first liquid battery module. The second solid-state battery module may not be in contact with the first liquid battery module. For example, there may be a space between the second solid-state battery module and the first liquid battery module. A plurality of solid-state battery modules including the second solid-state battery module may be disposed in succession. The second solid-state battery module may include an inorganic solid electrolyte or may include an organic solid electrolyte. There is no particular limitation on the shape of the second solid-state battery module. The shape of the second solid-state battery module may be, for example, a cube, a rectangular parallelepiped, or a cylinder.

For example, the battery module further includes a battery case that accommodates the first liquid battery module, the first solid-state battery module, and the second solid-state battery module. One or more side surfaces of the first solid-state battery module and one or more side surfaces of the second solid-state battery module may be in contact with one or more inner surfaces of the battery case. The first liquid battery module may be disposed in a closed space enclosed by the main surface of the first solid-state battery module, the main surface of the second solid-state battery module, and the inner surfaces of the battery case.

Thus, since the first liquid battery module is disposed in the closed space, even if the first liquid battery module catches fire, the fire is not easily spread to other liquid battery modules. That is, a highly reliable battery module is implemented.

For example, the first solid-state battery module covers the main surface and side surfaces of the first liquid battery module.

Thus, since the main surface and side surfaces of the first liquid battery module are covered with the first solid-state battery module, which does not easily catch fire, even if the first liquid battery module catches fire, the fire does not easily spread to other liquid battery modules. That is, a highly reliable battery module is implemented.

For example, the battery module further includes a third solid-state battery module. The first solid-state battery module may cover the main surface of the first liquid battery module and the third solid-state battery module may cover the side surfaces of the first liquid battery module.

Thus, since the main surface and side surfaces of the first liquid battery module are covered with the first solid-state battery module and third solid-state battery module, which do not easily catch fire, even if the first liquid battery module catches fire, the fire does not easily spread to other liquid battery modules. That is, a highly reliable battery module is implemented. The shape of the third solid-state battery module may be, for example, a cube, a rectangular parallelepiped, or a cylinder.

For example, the first liquid battery module includes liquid battery cells each of which includes an electrolyte solution containing an organic substance, and the first solid-state battery module includes solid-state battery cells each of which includes a solid electrolyte. The first liquid battery module may include no or one solid-state battery cell, or includes a smaller number of solid-state battery cells than a number of the solid-state battery cells in the first solid-state battery module. The first solid-state battery module may include no or one liquid battery cell, or includes a smaller number of liquid battery cells than a number of the liquid battery cells in the first liquid battery module.

Thus, even if the first liquid battery module catches fire, the fire does not easily spread to other liquid battery modules because the first solid-state battery module that includes relatively much more solid electrolyte and thereby does not easily catch fire functions as a barrier. That is, a highly reliable battery module is implemented.

For example, the first solid-state battery module includes no liquid battery cell.

Thus, even if the first liquid battery module catches fire, the fire does not easily spread to other liquid battery modules because the first solid-state battery module that lacks an electrolyte solution and thereby does not easily catch fire functions as a barrier. That is, a highly reliable battery module is implemented.

For example, the first liquid battery module includes no solid-state battery cell.

Thus, even if the first liquid battery module that lacks a solid electrolyte catches fire, the fire does not easily spread to other liquid battery modules. That is, a highly reliable battery module is implemented.

For example, the battery module further includes a second liquid battery module. The first solid-state battery module may be disposed between the first liquid battery module and the second liquid battery module. The first solid-state battery module may be in contact with the first liquid battery module and the second liquid battery module.

Thus, even if the first liquid battery module catches fire, the fire does not easily spread to the second liquid battery module because the first solid-state battery module functions as a barrier. That is, a highly reliable battery module is implemented. The second liquid battery module may include unit cells. The second liquid battery module may have a smaller volume than the volume of the first solid-state battery module. The first solid-state battery module may not be in contact with the second liquid battery module. For example, there may be a space between the first solid-state battery module and the second liquid battery module. A plurality of liquid battery modules including the second liquid battery module may be arranged in succession. There is no particular limitation on the shape of the second liquid battery module. The shape of the second liquid battery module may be, for example, a cube, a rectangular parallelepiped, or a cylinder.

Embodiments will be described below with reference to the drawings. All embodiments described below illustrate general or specific examples. Numerals, shapes, materials, constituent elements, the placement positions and connection forms of these constituent elements, steps, the sequence of these steps, and the like are only examples, and are not intended to restrict the present disclosure. Of the constituent elements described in the embodiments below, constituent elements not described in independent claims, each of which indicates the topmost concept, will be described as optional constituent elements.

Each drawing is a schematic drawing and is not necessarily drawn in a rigorous manner. In all drawings, the essentially same constituent elements are denoted by the same numerals and repeated descriptions will be omitted or simplified.

In the drawings referenced in the embodiments described below, coordinate axes may be indicated. The X-axis direction of the coordinate axes will be described as, for example, the thickness direction of a solid-state battery module and a liquid battery module. The Y-axis direction will be described as the horizontal direction of the solid-state battery module and the liquid battery module, and the Z-axis direction will be described as the vertical direction of the solid-state battery module and the liquid battery module. A surface parallel to the Y-Z plane of the solid-state battery module and the liquid battery module will be described as a main surface. In other words, a main surface is an upper surface or a lower surface of the solid-state battery module or the liquid battery module. A pair of their widest surfaces are main surfaces. Surfaces of the solid-state battery module and the liquid battery module other than the main surface will be described as the side surfaces.

First Embodiment

Structure

Figure 1B:
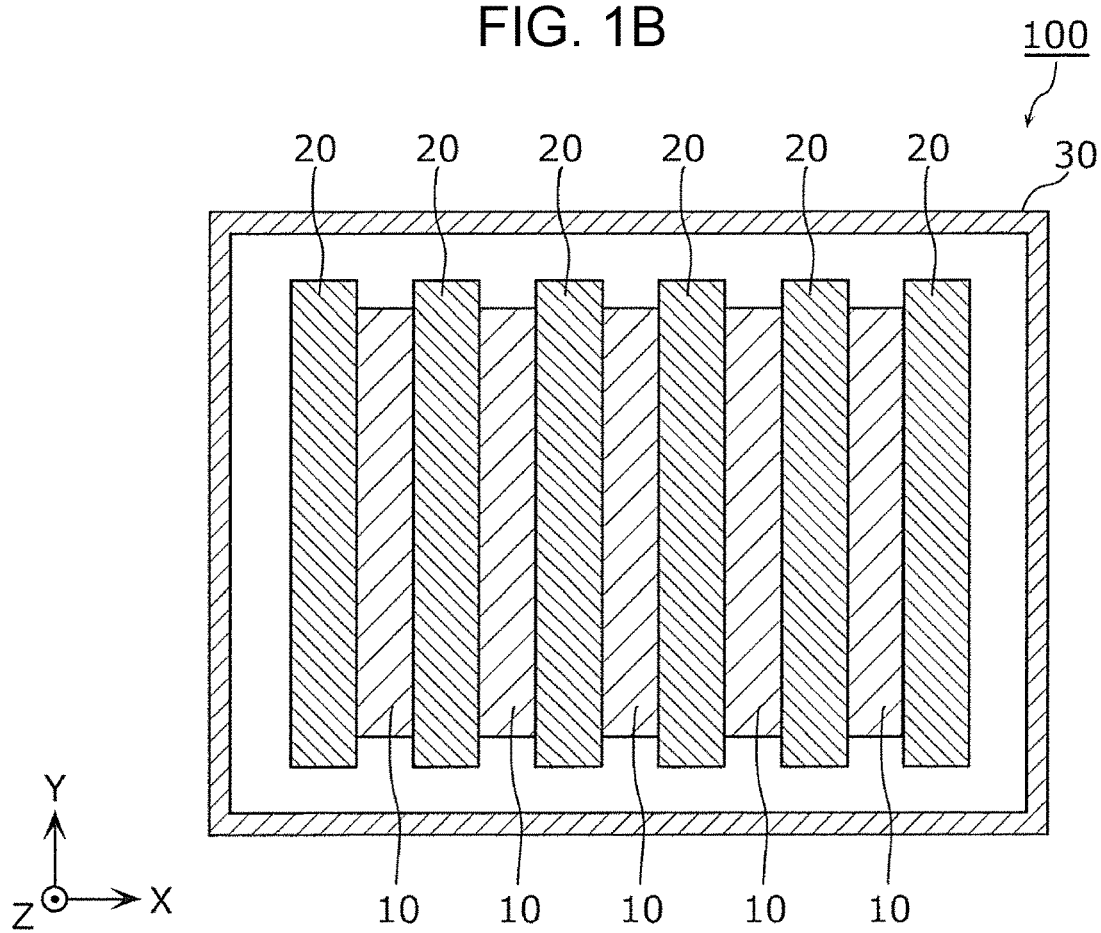
FIG. 1B is a schematic cross-sectional view when the battery module according to the first embodiment is cut along a plane parallel to the X-Y plane.

The structure of a battery module according to a first embodiment will be described below with reference to the drawings. FIG. 1A is a schematic cross-sectional view when the battery module according to the first embodiment is cut along a plane parallel to the Z-X plane. FIG. 1B is a schematic cross-sectional view when the battery module according to the first embodiment is cut along a plane parallel to the X-Y plane. FIG. 1C is a schematic cross-sectional view when the battery module according to the first embodiment is cut along a plane parallel to the Y-Z plane.

As illustrated in FIGS. 1A to 1C, the battery module 100 according to the first embodiment has a plurality of liquid battery modules 10, a plurality of solid-state battery modules 20, and a battery case 30. As for the liquid battery modules 10 and solid-state battery modules 20, however, the battery module 100 only needs to include at least one liquid battery module 10 and at least one solid-state battery module 20. There is no particular limitation on the number of liquid battery modules 10 and solid-state battery modules 20 included in the battery module 100.

The liquid battery module 10, which is an example of a first liquid battery module and a second liquid battery module, includes much more liquid electrolyte (electrolyte solution) including an organic substance or gel electrolyte formed from a macromolecular compound than the solid-state battery module 20. In other words, the liquid battery module 10 has more liquid battery cells each of which includes an electrolyte solution including an organic substance or a gel electrolyte formed from macromolecular module than the solid-state battery module 20. A liquid prepared by dissolving an electrolyte in a solvent formed from an organic substance, for example, is used as the electrolyte solution. A generally known organic solvent material used to prepare a battery electrolyte solution is used as the organic substance employed as a solvent. A generally known electrolyte material used to prepare a battery electrolyte solution is used as the electrolyte. The liquid battery module 10 may include no solid electrolyte. That is, the liquid battery module 10 may include no solid-state battery cell.

The liquid battery module 10 is shaped like a flat rectangular parallelepiped (e.g., rectangular plate), the thickness direction of the liquid battery module 10 being the X-axis direction. For example, the length of the liquid battery module 10 in the Z-axis direction (vertical direction) is about 300 mm, the length in the X direction (thickness direction) is about 68 mm, and the length in the Y direction (horizontal direction) is about 222 mm. However, the liquid battery module 10 may be formed in another shape and may have another size.

The solid-state battery module 20, which is an example of a first solid-state battery module and a second solid-state battery module, includes much more solid electrolyte than the liquid battery module 10. In other words, the solid-state battery module 20 has more solid-state battery cells each of which includes a solid electrolyte than the liquid battery module 10. A generally known solid electrolyte material for use in a battery, for example, is used as the solid electrolyte. The solid electrolyte may be inorganic or may be organic. The solid-state battery module 20 may be an all-solid-state battery module, which includes no liquid electrolyte. That is, the solid-state battery module 20 may include no liquid battery cell.

The solid-state battery module 20 is shaped like a flat rectangular parallelepiped (e.g., rectangular plate), the thickness direction of the solid-state battery module 20 being the X-axis direction. For example, the length of the solid-state battery module 20 in the Z-axis direction (vertical direction) is about 420 mm, the length in the X direction (thickness direction) is about 50 mm, and the length in the Y direction (horizontal direction) is about 300 mm. That is, the solid-state battery module 20 has a larger outside shape (volume) than the liquid battery module 10. However, the solid-state battery module 20 may be formed in another shape and may have another size as long as the solid-state battery module 20 has a larger volume than the volume of the liquid battery module 10.

Each of the liquid battery module 10 and solid-state battery module 20 is implemented by, for example, sealing a laminated body formed from a positive-electrode layer, a negative-electrode layer, and an electrolyte layer in an outer package to form a battery cell, further laminating battery cells of this type, and sealing them in an outer package. That is, each of the liquid battery module 10 and solid-state battery module 20 includes a plurality of battery cells (one or more liquid battery cells and/or one or more solid-state battery cells) that are electrically connected together. Specifically, each of the liquid battery module 10 and solid-state battery module 20 is implemented as a lithium secondary battery module.

The liquid battery cell is a battery that includes much more liquid electrolyte (electrolyte solution) including an organic substance than the solid-state battery cell. A liquid prepared by dissolving an electrolyte in a solvent formed from an organic substance, for example, is used as the electrolyte solution. A generally known organic solvent material used to prepare a battery electrolyte solution is used as the organic substance employed as a solvent. A generally known electrolyte material used to prepare a battery electrolyte solution is used as the electrolyte. The liquid battery cell may include no solid electrolyte. The liquid battery cell may be a unit cell.

The liquid battery cell is shaped like a flat rectangular parallelepiped (e.g., rectangular plate), the thickness direction of the liquid battery cell being the X-axis direction. For example, the length of the liquid battery cell in the Z-axis direction (vertical direction) is about 26.5 mm, the length in the X direction (thickness direction) is about 1 mm, and the length in the Y direction (horizontal direction) is about 148 mm. However, the liquid battery cell may be formed in another shape and may have another size.

The solid-state battery cell is a battery that includes much more solid electrolyte than the liquid battery cell. The solid-state battery cell is, for example, an all-solid-state battery, which includes no liquid electrolyte. A generally known solid electrolyte material for use in a battery, for example, is used as the solid electrolyte. The solid electrolyte may be inorganic or may be organic. The solid-state battery cell may be a unit cell.

The solid-state battery cell is shaped like a flat rectangular parallelepiped (e.g., rectangular plate), the thickness direction of the solid-state battery cell being the X-axis direction. For example, the length of the solid-state battery cell in the Z-axis direction (vertical direction) is about 32.5 mm, the length in the X direction (thickness direction) is about 1 mm, and the length in the Y direction (horizontal direction) is about 154 mm. That is, the solid-state battery cell has a larger outside shape (volume) than the liquid battery cell. However, the solid-state battery cell may be formed in another shape and may have another size as long as the solid-state battery cell has a larger volume than the volume of the liquid battery cell.

Although not illustrated in detail, each of the liquid battery cell and solid-state battery cell includes a positive-electrode layer and a negative-electrode layer besides an electrolyte layer including an electrolyte (electrolyte solution). The electrolyte layer is interposed between the positive-electrode layer and the negative-electrode layer.

The positive-electrode layer includes a positive-electrode active material that can occlude and release metal ions (lithium ions, for example). A generally known active material for the positive electrode of a battery is used as the positive-electrode active material.

The negative-electrode layer includes a negative-electrode active material that can occlude and release metal ions (lithium ions, for example). A generally known active material for the negative electrode of a battery is used as the negative-electrode active material.

The battery case 30 is a hollow case in which a plurality of liquid battery modules 10 and a plurality of solid-state battery modules 20 are accommodated. The battery case 30 is in a substantially rectangular parallelepiped shape. The battery case 30 may be made of a metal material or a resin material.

Placement of Liquid Battery Modules and Solid-State Battery Modules

In the battery case 30, the plurality of liquid battery modules 10 and the plurality of solid-state battery modules 20 are alternately disposed in such a way that their main surfaces are in contact with each other. Specifically, each solid-state battery module 20 is disposed in contact with adjacent liquid battery modules 10. For example, one liquid battery module 10 is sandwiched between two solid-state battery modules 20. One solid-state battery module 20 is disposed between two liquid battery modules 10 so as to be in contact with the two liquid battery modules 10. At least part of the plurality of liquid battery modules 10 may be arranged in succession. That is, two or more liquid battery modules 10 may be sandwiched between two solid-state battery modules 20. Alternatively, two or more liquid battery modules 10 may be disposed in succession at an end of a battery module string. At least part of the plurality of solid-state battery modules 20 may be arranged in succession. That is, two or more solid-state battery modules 20 may be sandwiched between two liquid battery modules 10. Alternatively, two or more solid-state battery modules 20 may be disposed in succession at an end of a battery module string. At least one liquid battery module 10 may not be in contact with any solid-state battery module 20. Supports (e.g., holders) that support the plurality of liquid battery modules 10 and the plurality of solid-state battery modules 20 may be provided in the battery case 30.

The outer shape of the solid-state battery module 20 is a size larger than the outer shape of the liquid battery module 10. The distance from a side surface of the liquid battery module 10 to an inner surface of the battery case 30 is longer than the distance from a side surface of the solid-state battery module 20 to the inner surface of the battery case 30. As illustrated in FIG. 1C, therefore, the liquid battery module 10 is disposed behind the solid-state battery module 20 and is invisible when viewed from a direction perpendicular to the main surface of the liquid battery module 10. The distance from the side surface of the liquid battery module 10 to the inner surface of the battery case 30 is, for example, 5 mm or longer. The distance from the side surface of the solid-state battery module 20 to the inner surface of the battery case 30 is also, for example, 5 mm or loner.

In the structure described above, the solid-state battery module 20, which is less likely to catch fire and is larger than the liquid battery module 10, is disposed between liquid battery modules 10, which are highly likely to catch fire, so the solid-state battery module 20 functions as a fire wall. Therefore, it is possible to implement the highly reliable battery module 100 that suppresses the spread of fire from one liquid battery module 10 to other liquid battery modules 10. The solid-state battery module 20 may have a single-layer structure or may have a laminated structure.

Second Embodiment

Figure 2A:
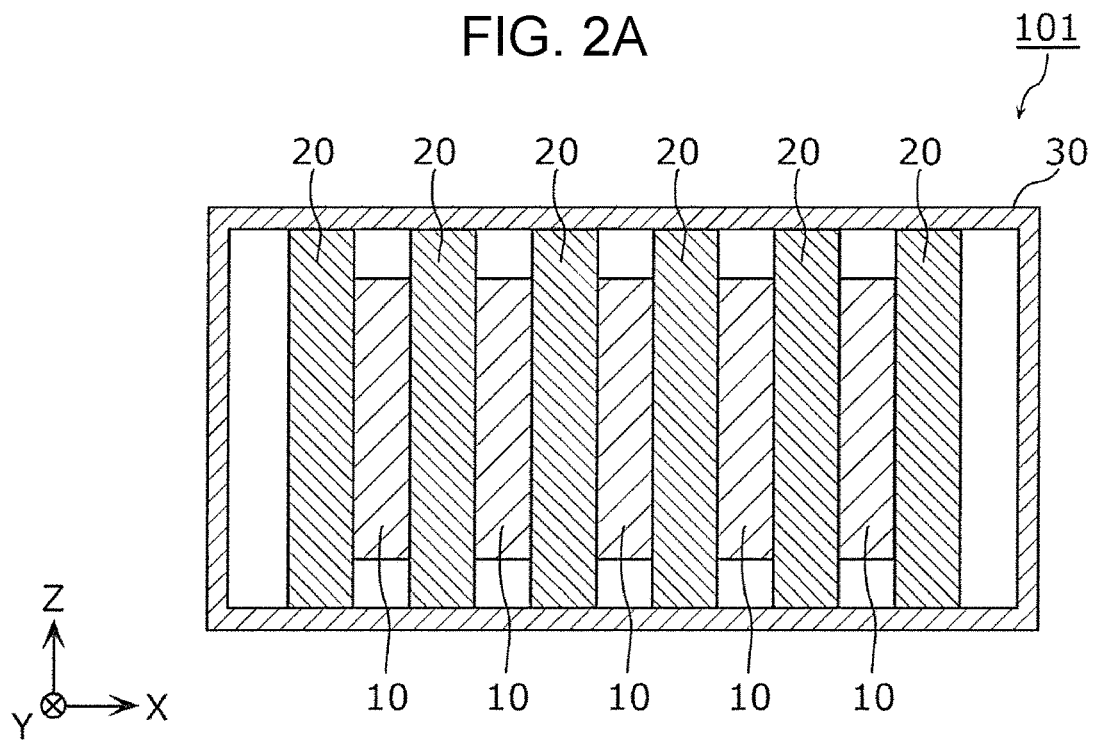
FIG. 2A is a schematic cross-sectional view when a battery module according to a second embodiment is cut along a plane parallel to the Z-X plane.
Figure 2B:
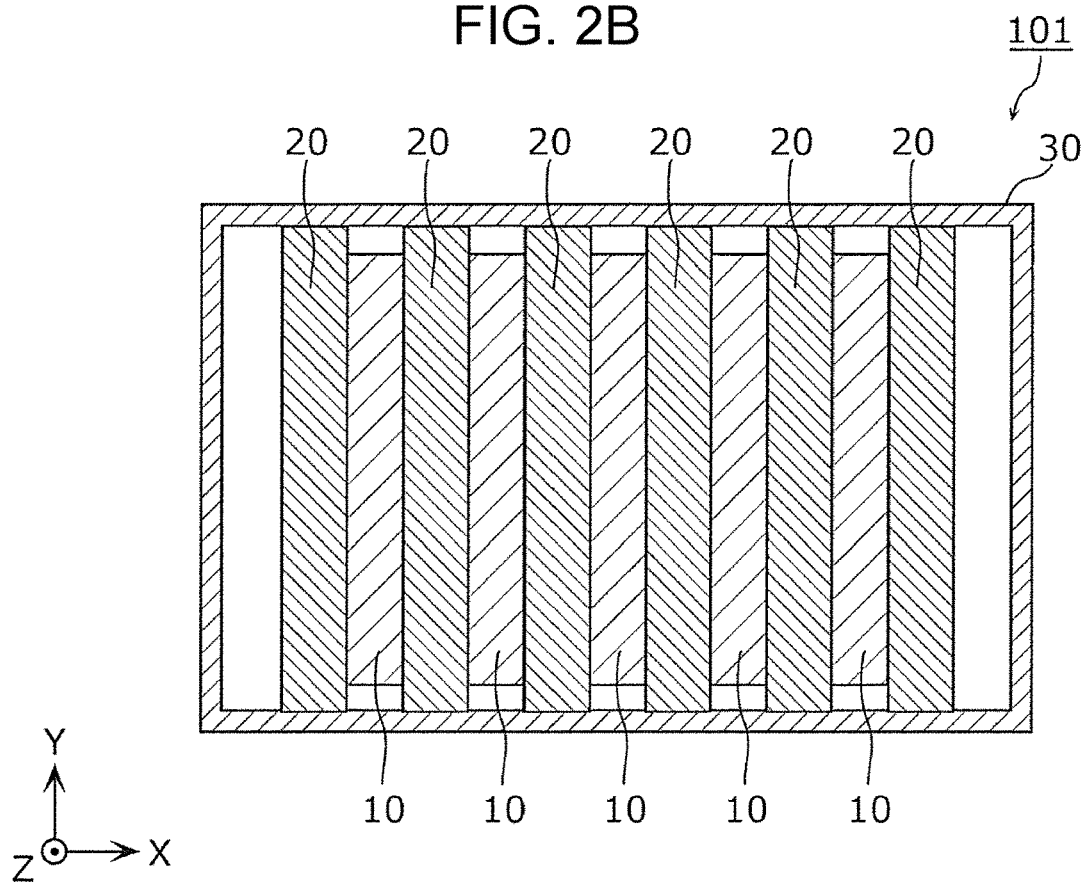
FIG. 2B is a schematic cross-sectional view when the battery module according to the second embodiment is cut along a plane parallel to the X-Y plane.
Figure 2C:
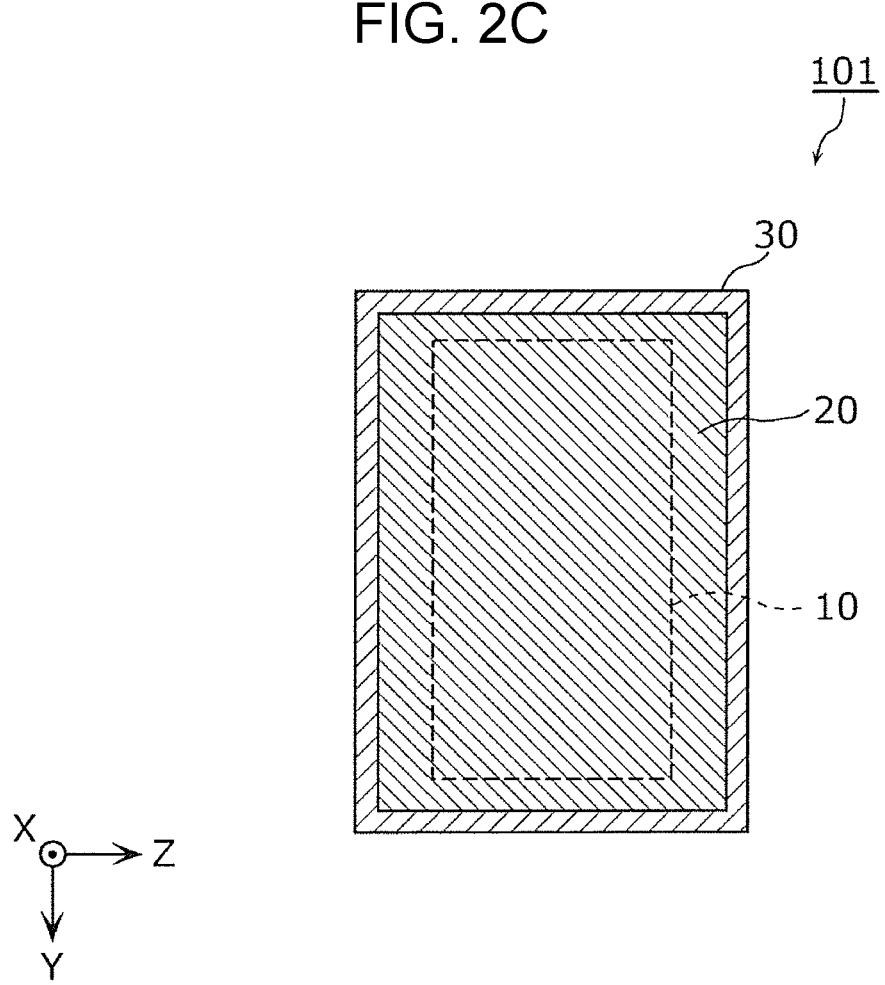
FIG. 2C is a schematic cross-sectional view when the battery module according to the second embodiment is cut along a plane parallel to the Y-Z plane.

Placement of Liquid Battery Modules and Solid-State Battery Modules in a Second Embodiment Next, a battery module according to a second embodiment will be described. FIG. 2A is a schematic cross-sectional view when the battery module according to the second embodiment is cut along a plane parallel to the Z-X plane. FIG. 2B is a schematic cross-sectional view when the battery module according to the second embodiment is cut along a plane parallel to the X-Y plane. FIG. 2C is a schematic cross-sectional view when the battery module according to the second embodiment is cut along a plane parallel to the Y-Z plane. In the second embodiment below, differences from the first embodiment will be mainly described and repeated descriptions will be omitted.

As illustrated in FIGS. 2A to 2C, the battery module 101 according to the second embodiment has a plurality of liquid battery modules 10, a plurality of solid-state battery modules 20, and the battery case 30 in which the plurality of liquid battery modules 10 and the plurality of solid-state battery modules 20 are accommodated. As for the liquid battery modules 10 and solid-state battery modules 20, however, the battery module 101 only needs to include at least one liquid battery module 10 and at least one solid-state battery module 20. There is no particular limitation on the number of liquid battery modules 10 and solid-state battery modules 20 included in the battery module 101.

In the battery case 30, the plurality of liquid battery modules 10 and the plurality of solid-state battery modules 20 are alternately disposed in such a way their main surfaces are in contact with each other. Specifically, each solid-state battery module 20 is disposed in contact with adjacent liquid battery modules 10. For example, one liquid battery module 10 is sandwiched between two solid-state battery modules 20.

The solid-state battery module 20 is a size larger than the liquid battery module 10. The side surfaces of the solid-state battery module 20 are in contact with the inner surfaces of the battery case 30. The solid-state battery module 20 may be formed integrally with the battery case 30. Each liquid battery module 10 is disposed in a closed space enclosed by the main surfaces of two solid-state battery modules 20 and the inner surfaces of the battery case 30. The closed space described here refers to a substantially closed space. The closed space may be a sealed space. However, it is not a necessity that the closed space is a sealed space.

In the structure described above, the liquid battery module 10, which is highly likely to catch fire, is disposed in a closed space formed by solid-state battery modules 20, which are less likely to catch fire, and the battery case 30, so even if one liquid battery module 10 catches fire, the possibility that the fire spreads to other liquid battery modules 10 is very low. That is, it is possible to implement the highly reliable battery module 101 that suppresses the spread of fire from one liquid battery module 10 to other liquid battery modules 10. At least part of the plurality of liquid battery modules 10 may be arranged in succession. That is, two or more liquid battery modules 10 may be sandwiched between two solid-state battery modules 20. Alternatively, two or more liquid battery modules 10 may be disposed in succession at an end of a battery module string. In this case as well, it is possible to suppress the spread of fire between the two or more liquid battery modules 10 and other liquid battery modules 10. At least part of the plurality of solid-state battery modules 20 may be arranged in succession. That is, two or more solid-state battery modules 20 may be sandwiched between two liquid battery modules 10. Alternatively, two or more solid-state battery modules 20 may be disposed in succession at an end of a battery module string. At least one liquid battery module 10 may not be in contact with any solid-state battery module 20. Supports (e.g., holders) that support the plurality of liquid battery modules 10 and the plurality of solid-state battery modules 20 may be provided in the battery case 30. The solid-state battery module 20 may have a single-layer structure or may have a laminated structure.

Third Embodiment

Figure 3A:
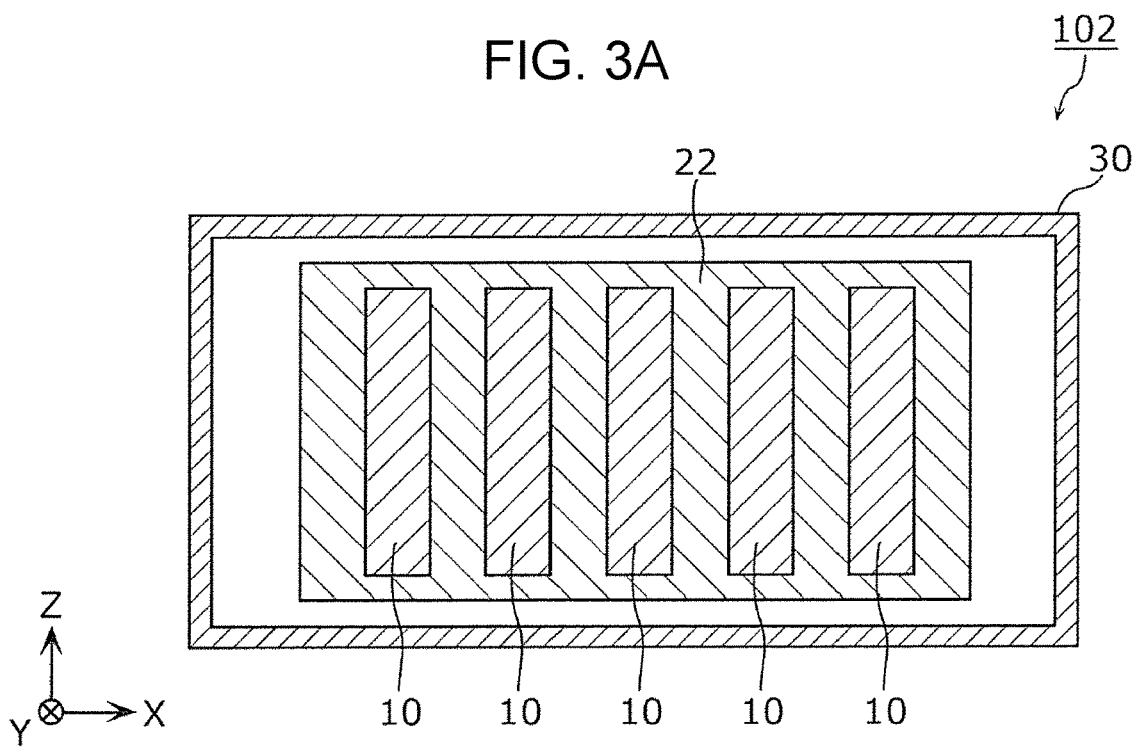
FIG. 3A is a schematic cross-sectional view when a battery module according to a third embodiment is cut along a plane parallel to the Z-X plane.
Figure 3B:
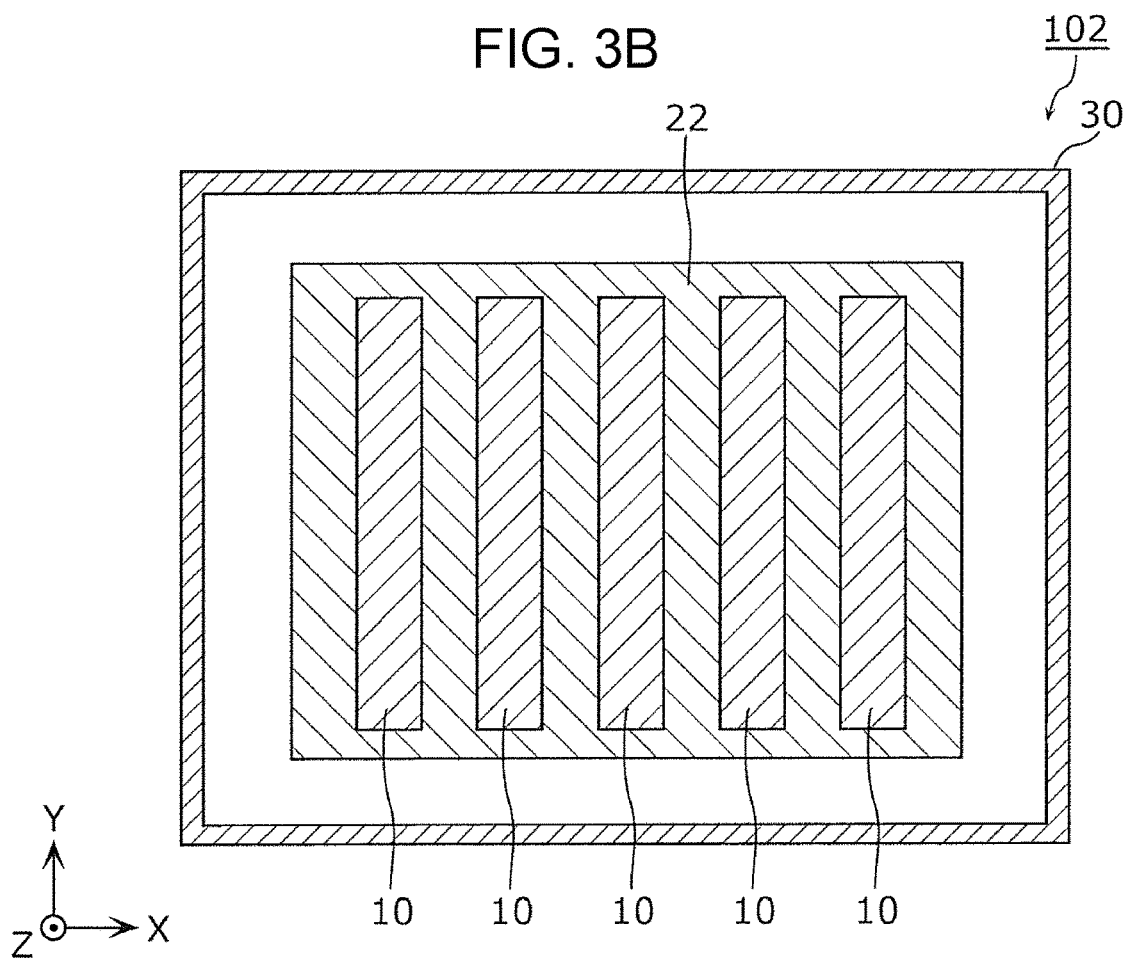
FIG. 3B is a schematic cross-sectional view when the battery module according to the third embodiment is cut along a plane parallel to the X-Y plane.
Figure 3C:
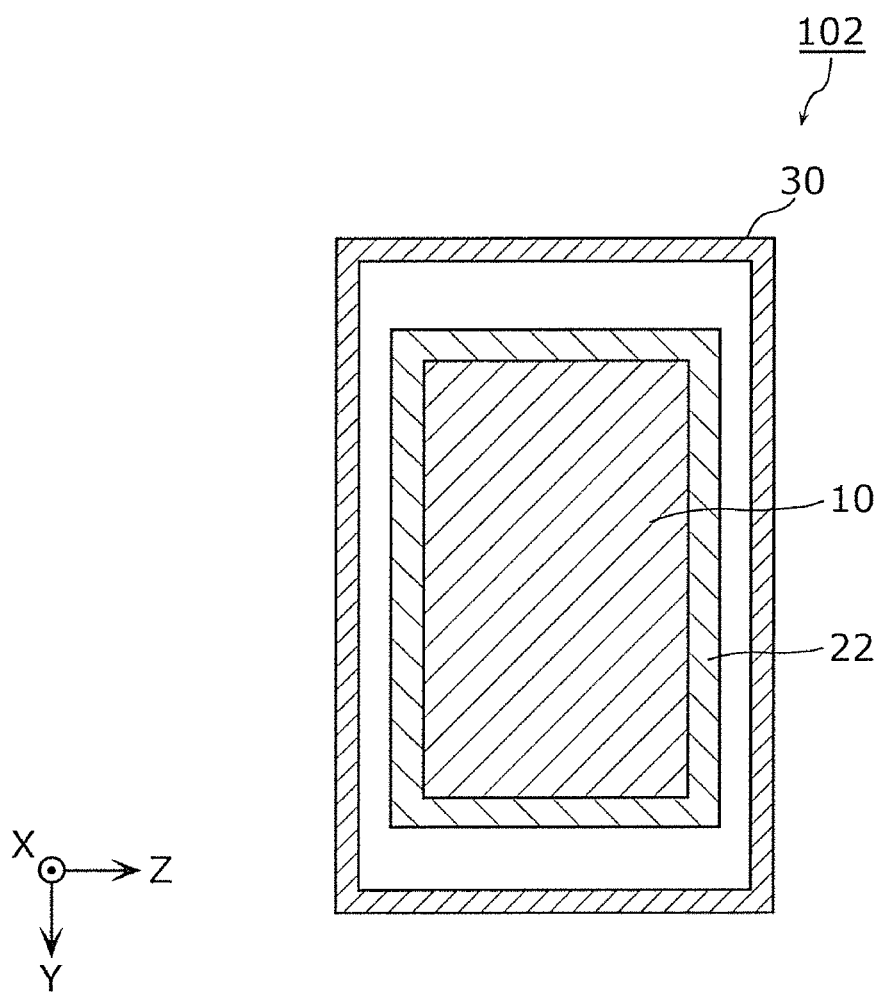
FIG. 3C is a schematic cross-sectional view when the battery module according to the third embodiment is cut along a plane parallel to the Y-Z plane.

Placement of Liquid Battery Modules and Solid-State Battery Modules in a Third Embodiment Next, a battery module according to a third embodiment will be described. FIG. 3A is a schematic cross-sectional view when the battery module according to the third embodiment is cut along a plane parallel to the Z-X plane. FIG. 3B is a schematic cross-sectional view when the battery module according to the third embodiment is cut along a plane parallel to the X-Y plane. FIG. 3C is a schematic cross-sectional view when the battery module according to the third embodiment is cut along a plane parallel to the Y-Z plane. In the third embodiment below, differences from the first and second embodiments will be mainly described and repeated descriptions will be omitted.

As illustrated in FIGS. 3A to 3C, the battery module 102 according to the third embodiment has a plurality of liquid battery modules 10, a solid-state battery module 22, and the battery case 30 in which the plurality of liquid battery modules 10 and the solid-state battery module 22 are accommodated. As for the liquid battery modules 10, however, the battery module 102 only needs to include at least one liquid battery module 10. There is no particular limitation on the number of liquid battery modules 10 included in the battery module 102.

The solid-state battery module 22 has spaces in which liquid battery modules 10 are accommodated so as to be enclosed. Each of the plurality of liquid battery modules 10 is disposed in one space. This space has almost the same outer shape and size as the liquid battery module 10. Therefore, the solid-state battery module 22 is in contact with the main surface and side surfaces of each of the plurality of liquid battery modules 10, and covers the main surface and side surfaces of each of the plurality of liquid battery modules 10. That is, all the surfaces of each liquid battery module 10 may be covered by the solid-state battery module 22. Since the plurality of liquid battery modules 10 are covered by the solid-state battery module 22, the plurality of liquid battery modules 10 are invisible to the outside. Part of the solid-state battery module 22 is interposed between one liquid battery module 10 and another liquid battery module 10.

In the structure described above, the whole of each liquid battery module 10, which is highly likely to catch fire, is covered by the solid-state battery module 22, which is less likely to catch fire, so even if one liquid battery module 10 catches fire, the possibility that the fire spreads to other liquid battery modules 10 is very low. That is, it is possible to implement the highly reliable battery module 102 that suppresses the spread of fire from one liquid battery module 10 to other liquid battery modules 10. At least part of the plurality of liquid battery modules 10 may be arranged in succession. At least one liquid battery module 10 may not be in contact with the solid-state battery module 22. Supports (e.g., holders) that support the plurality of liquid battery modules 10 and the solid-state battery module 22 may be provided in the battery case 30. The solid-state battery module 22 may be composed of a plurality of unit cell modules. The solid-state battery module 22 may have a single-layer structure or may have a laminated structure.

Variations of the Battery Module According to the Third Embodiment

Figure 4:
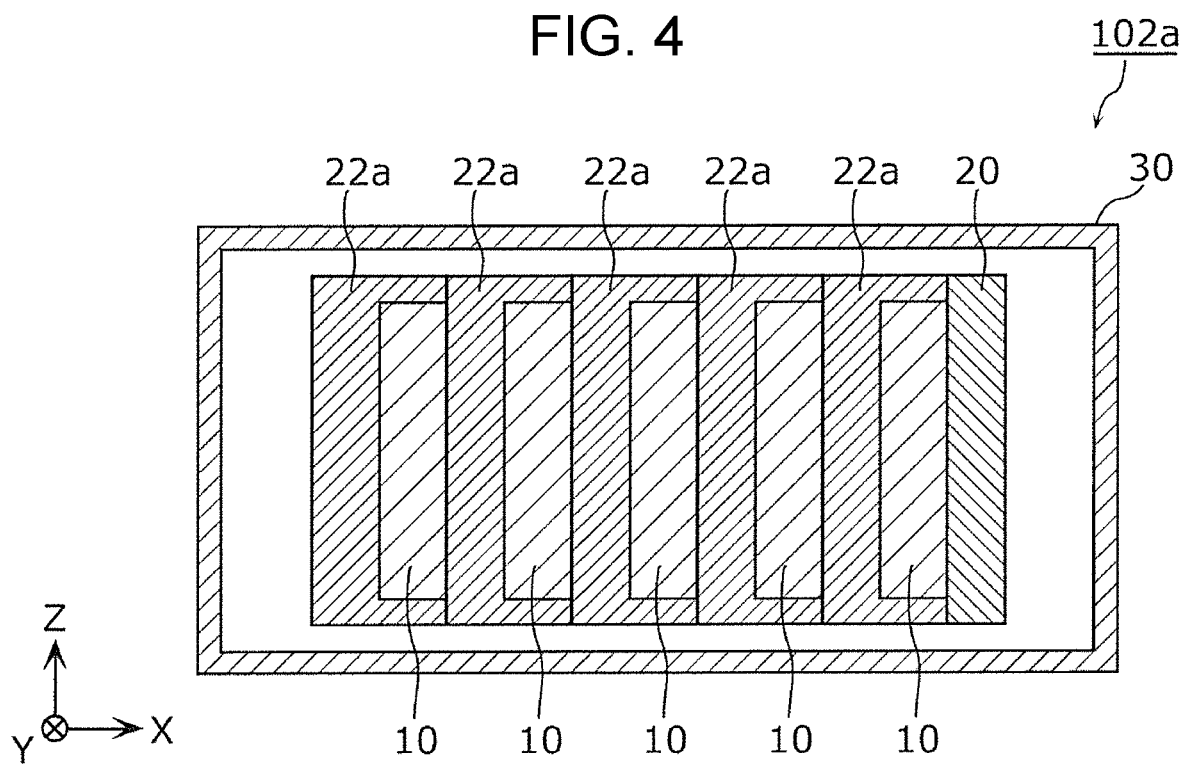
FIG. 4 is a schematic cross-sectional view when a battery module according to a first variation of the third embodiment is cut along a plane parallel to the Z-X plane.

Although, in the battery module 102, the main surface and side surfaces of each of the plurality of liquid battery modules 10 are covered with one solid-state battery module 22, the main surface and side surfaces of each of the plurality of liquid battery modules 10 may be covered with a plurality of solid-state battery modules. FIG. 4 is a schematic cross-sectional view when a battery module according to a first variation of the third embodiment described above is cut along a plane parallel to the Z-X plane.

As illustrated in FIG. 4, the battery module 102a according to the first variation of the third embodiment has a plurality of liquid battery modules 10, the solid-state battery module 20, a plurality of solid-state battery modules 22a, and the battery case 30 in which the plurality of liquid battery modules 10, the solid-state battery module 20, and the plurality of solid-state battery modules 22a are accommodated.

In the battery module 102a, the solid-state battery module 22 described above is implemented by a plurality of solid-state battery modules 22a and the solid-state battery module 20. Each solid-state battery module 22a is an example of the first solid-state battery module and second solid-state battery module. The solid-state battery module 22a has an electrolyte similar to the electrolyte of, for example, the solid-state battery module 20. The solid-state battery module 22a may be a unit cell module.

Each solid-state battery module 22a has a concave part in which one liquid battery module 10 is accommodated. The concave part has almost the same outer shape and size as the liquid battery module 10. When the liquid battery module 10 is accommodated in the concave part of one solid-state battery module 22a, the main surface of the liquid battery module 10, the main surface not being in contact with the one solid-state battery module 22a, is in contact with the bottom surface of another solid-state battery module 22a. The main surface of the liquid battery module 10 at the positive end of the X axis in the X-axis direction, the main surface not being in contact with any solid-state battery module 22a, is in contact with the main surface of the solid-state battery module 20 in a rectangular parallelepiped shape.

In the structure described above, the whole of each liquid battery module 10, which is highly likely to catch fire, is covered by at least one of the solid-state battery module 20 and solid-state battery module 22a, which are less likely to catch fire, so even if one liquid battery module 10 catches fire, the possibility that the fire spreads to other liquid battery modules 10 is very low. That is, it is possible to implement the highly reliable battery module 102a that suppresses the spread of fire from one liquid battery module 10 to other liquid battery modules 10. At least part of the plurality of liquid battery modules 10 may be arranged in succession. That is, two or more liquid battery modules 10 may be accommodated in the concave part of one solid-state battery module 22a. At least one liquid battery module 10 may not be in contact with any solid-state battery module 22a. Supports (e.g., holders) that support the plurality of liquid battery modules 10, the plurality of solid-state battery modules 22a, and the solid-state battery module 20 may be provided in the battery case 30.

Figure 5:
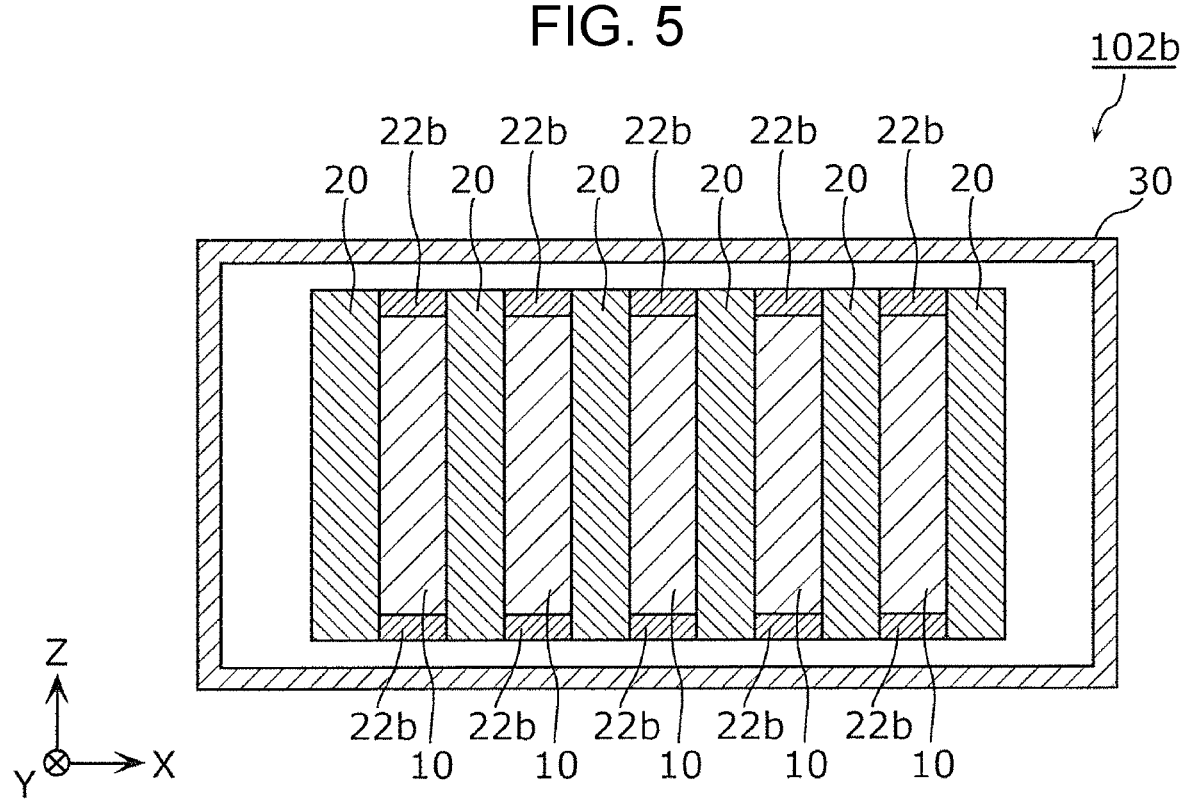
FIG. 5 is a schematic cross-sectional view when a battery module according to a second variation of the third embodiment is cut along a plane parallel to the Z-X plane.

The solid-state battery module 22 may be implemented by adding, to the battery module 100, a solid-state battery module that covers the side surfaces of the liquid battery module 10. FIG. 5 is a schematic cross-sectional view when a battery module according to a second variation of the third embodiment is cut along a plane parallel to the Z-X plane.

As illustrated in FIG. 5, the battery module 102b according to the second variation of the third embodiment has a plurality of liquid battery modules 10, a plurality of solid-state battery modules 20, a plurality of solid-state battery modules 22b, and the battery case 30 in which the plurality of liquid battery modules 10, the plurality of solid-state battery modules 20, and the plurality of solid-state battery modules 22b are accommodated.

In the battery module 102b, the side surfaces of each of the plurality of liquid battery modules 10 are covered by a plurality of solid-state battery modules 22b. Each of the plurality of solid-state battery module 22b is an example of a third solid-state battery module. The solid-state battery module 22b has an electrolyte similar to the electrolyte of, for example, the solid-state battery module 20. The solid-state battery module 22b may be a unit cell module.

Each of the plurality of solid-state battery modules 22b is disposed between two solid-state battery modules 20 and at one end of one liquid battery module 10. Four solid-state battery modules 22b are disposed for one liquid battery module 10 in correspondence to four directions so that they enclose the liquid battery module 10 from the four directions. For one liquid battery module 10, however, one solid-state battery module 22b may be disposed that has a rectangular ring shape formed so as to enclose the four surfaces of the liquid battery module 10.

In the structure described above, the whole of each liquid battery module 10, which is highly likely to catch fire, is covered by solid-state battery modules 20 and solid-state battery modules 22b, which are less likely to catch fire, so even if one liquid battery module 10 catches fire, the possibility that the fire spreads to other liquid battery modules 10 is very low. That is, it is possible to implement the highly reliable battery module 102b that suppresses the spread of fire from one liquid battery module 10 to other liquid battery modules 10. At least part of the plurality of liquid battery modules 10 may be arranged in succession. That is, one solid-state battery module 22b may cover the side surfaces of two or more liquid battery modules 10. At least one liquid battery module 10 may not be in contact with any solid-state battery module 22b. Supports (e.g., holders) that support the plurality of liquid battery modules 10, the plurality of solid-state battery modules 22b, and the plurality of solid-state battery modules 20 may be provided in the battery case 30.

Fourth Embodiment

Figure 6:
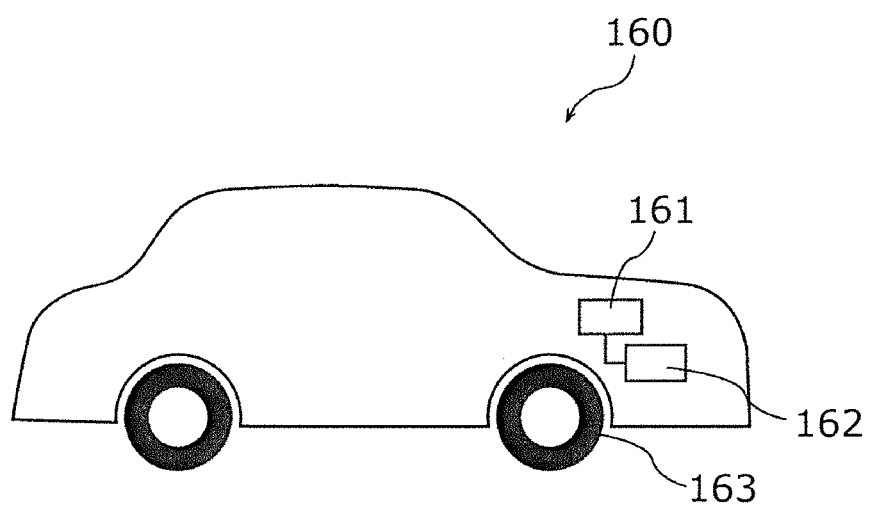
FIG. 6 schematically illustrates the structure of a vehicle according to a fourth embodiment.

FIG. 6 schematically illustrates the structure of a vehicle according to a fourth embodiment. The vehicle 160 in the fourth embodiment is, for example, an electric vehicle. The vehicle 160 has an electric motor 161, a battery module 162, and wheels 163. The battery module 162 is the battery module in any one of the embodiments and variations described above. The battery module 162 supplies electric power to the electric motor 161 to drive the electric motor 161. The electric motor 161 rotates the wheels 163, moving the vehicle 160. The vehicle 160 may be another automobile such as a hybrid car. Alternatively, the vehicle 160 may be another vehicle such as an electric train, an airplane, or a ship.

In the structure described above, the electric motor 161 is driven by electric power supplied from the highly reliable battery module 162 that suppresses the spread of fire from one liquid battery module 10 to other liquid battery modules 10, so it possible to move persons and luggage in a safe manner.

Other Embodiments

So far, embodiments have been described. However, the present disclosure is not limited to these embodiments. The present disclosure also includes embodiments in which various variations that a person having ordinary skill in the art thinks of are applied to the embodiments described above and embodiments in which constituent elements and functions described in the above first to fourth embodiments are arbitrarily combined without departing from the intended scope of the present disclosure.

For example, the present invention may be implemented as a battery pack. The battery pack has, for example, two or more liquid battery modules or solid-state battery modules, a peripheral device such as a sensor or controller (in other words, a control circuit), and a battery case that accommodates them. In the embodiments described above, the term "battery module" may be appropriately read as referring to "battery pack".

The present invention is useful as a highly reliable battery module.

What is claimed is:

1. A battery module comprising:
   a first liquid battery module having a first surface, the first liquid battery module including a plurality of first liquid battery cells; and
   a first solid-state battery module, which has a second surface facing the first surface of the first liquid battery module, the first solid-state battery module including a plurality of first solid-state battery cells,
   wherein an area of the second surface is greater than that of the first surface.

2. The battery module according to claim 1, wherein a shape of the first liquid battery module is a rectangular parallelepiped or a cube, and a shape of the first solid-state battery module is a rectangular parallelepiped or a cube.

3. The battery module according to claim 1, wherein the first solid-state battery module is disposed in contact with the first liquid battery module.

4. The battery module according to claim 1, wherein
   the first liquid battery module has a third surface opposite to the first surface,
   the battery module further comprises a second solid-state battery module having a fourth surface facing the third surface of the first liquid battery module,
   an area of the fourth surface is greater than that of the third surface, and
   the first liquid battery module is disposed between the first solid-state battery module and the second solid-state battery module.

5. The battery module according to claim 4, wherein a shape of the second solid-state battery module is a rectangular parallelepiped or a cube.

6. The battery module according to claim 4, wherein the second solid-state battery module is disposed in contact with the first liquid battery module.

7. The battery module according to claim 4, further comprising a battery case that accommodates the first liquid battery module, the first solid-state battery module, and the second solid-state battery module, wherein:
   the first solid-state battery module, the second solid-state battery module, and the battery case define a closed space; and
   the first liquid battery module is disposed in the closed space.

8. The battery module according to claim 4, further comprising a battery case that accommodates the first liquid battery module, the first solid-state battery module, and the second solid-state battery module, wherein:
   the battery case has inner surfaces;
   the first solid-state battery module has at least one side surface that is in contact with at least one of the inner surfaces of the battery case;
   the second solid-state battery module has at least one side surface that is in contact with the at least one of the inner surfaces of the battery case; and
   the first liquid battery module is disposed in a closed space enclosed by the second surface of the first solid-state battery module, the fourth surface of the second solid-state battery module, and the at least one of the inner surfaces of the battery case.

9. The battery module according to claim 1, wherein
   the first liquid battery module has: the first surface covered by the second surface of the first solid-state battery module; and at least one side surface covered by the second surface of the first solid-state battery module.

10. The battery module according to claim 1, further comprising a third solid-state battery module, wherein
    the first liquid battery module has: the first surface covered by the second surface of the first solid-state battery module; and at least one side surface covered by the third solid-state battery module.

11. The battery module according to claim 10, wherein a shape of the third solid-state battery module is a rectangular parallelepiped or a cube.

12. The battery module according to claim 1, wherein
    the first liquid battery module includes liquid battery cells each of which includes an electrolyte solution containing an organic substance,
    the first solid-state battery module includes solid-state battery cells each of which includes a solid electrolyte,
    the first liquid battery module includes no or one solid-state battery cell, or includes a smaller number of solid-state battery cells than a number of the solid-state battery cells in the first solid-state battery module, and
    the first solid-state battery module includes no or one liquid battery cell, or includes a smaller number of liquid battery cells than a number of the liquid battery cells in the first liquid battery module.

13. The battery module according to claim 12, wherein the first solid-state battery module includes no liquid battery cell.

14. The battery module according to claim 12, wherein the first liquid battery module includes no solid-state battery cell.

15. The battery module according to claim 1, further comprising a second liquid battery module, wherein
    the first solid-state battery module is disposed between the first liquid battery module and the second liquid battery module.

16. The battery module according to claim 15, wherein a shape of the second liquid battery module is a rectangular parallelepiped or a cube.

17. The battery module according to claim 15, wherein the second liquid battery module is disposed in contact with the first solid-state battery module.

18. A vehicle comprising:
    a battery module; and
    an electric motor that is driven by electric power supplied from the battery module, wherein
    the battery module comprises:
    a first liquid battery module having a first surface, the first liquid battery module including a plurality of first liquid battery cells; and
    a first solid-state battery module, which has a second surface facing the first surface of the first liquid battery module, the first solid-state battery module including a plurality of first solid-state battery cells,
    wherein an area of the second surface is greater than that of the first surface.

19. A battery pack comprising:
    a first liquid battery module having a first surface, the first liquid battery module including a plurality of first liquid battery cells; and
    a first solid-state battery module, which has a second surface facing the first surface of the first liquid battery module, the first solid-state battery module including a plurality of first solid-state battery cells,
    wherein an area of the second surface is greater than that of the first surface.

* * * * *